US012712313B2

(12) United States Patent
Wen et al.

(10) Patent No.: US 12,712,313 B2
(45) Date of Patent: Aug. 18, 2026

(54) MULTIPLE-COMBINATION CONNECTOR

(71) Applicant: HARTING Electric Stiftung & Co. KG, Espelkamp (DE)

(72) Inventors: Ensign Wen, Zhuhai (CN); Denny Hellige, Bad Oeyenhausen (DE); Frank Böhmann, Lastrup (DE); Jens Horstmann, Zhuhai (CN)

(73) Assignee: HARTING Electric Stiftung & Co. KG, Espelkamp (DE)

( * ) Notice: Subject to any disclaimer, the term of this patent is extended or adjusted under 35 U.S.C. 154(b) by 491 days.

(21) Appl. No.: 18/280,840

(22) PCT Filed: Feb. 28, 2022

(86) PCT No.: PCT/DE2022/100161
§ 371 (c)(1),
(2) Date: Sep. 7, 2023

(87) PCT Pub. No.: WO2022/194324
PCT Pub. Date: Sep. 22, 2022

(65) Prior Publication Data

US 2024/0145981 A1 May 2, 2024

(30) Foreign Application Priority Data

Mar. 16, 2021 (CN) ......................... 202110281317.7

(51) Int. Cl.
*H01R 13/514* (2006.01)
*H01R 13/629* (2006.01)
(Continued)

(52) U.S. Cl.
CPC ......... *H01R 13/514* (2013.01); *H01R 13/629* (2013.01); *H01R 13/64* (2013.01);
(Continued)

(58) Field of Classification Search
None
See application file for complete search history.

(56) References Cited

U.S. PATENT DOCUMENTS 3,753,212 A * 8/1973 Yamada ............... H01R 13/514 439/559
5,326,279 A * 7/1994 Sumida ............ H01R 13/62933 439/157
(Continued)

FOREIGN PATENT DOCUMENTS

CN 104041066 A 9/2014
CN 109301589 A 2/2019
(Continued)

OTHER PUBLICATIONS

Weidmulleruk, "WOW" Our compact, high-current, connector system for rail engineering applications, Weidmüller UK, Aug. 27, 2014, https://weidmulleruk.wordpress.com/2014/08/27/wow-our-compact-high-current-connector-system-for-rail-engineering-applications/.

*Primary Examiner* — Tho D Ta
(74) *Attorney, Agent, or Firm* — Smartpat PLC

(57) ABSTRACT

A multiple-combination connector includes a housing which is formed by a lower housing and a matching upper housing. The lower housing has at least one opening. At least one socket is attached to the opening. A plurality of individual plugs which can be independently inserted into the socket. The connector can bring about a flexible combination of different types and different numbers of plugs/sockets and meet different application requirements. Since the design is that of a single plug, it is possible to assemble and disassemble the cables one by one, thereby facilitating assembly. The connector can prevent incorrect insertion and withstand disassembly and assembly. The problem of powder spraying is easily solved. The EMC functions, Ingress Protection
(Continued)

(waterproof and dustproof) functions and protective earthing functions are implemented. The accumulation of rain, snow, ice and dust is effectively prevented, and small size and easy installation are achieved.

18 Claims, 9 Drawing Sheets

(51) Int. Cl.

| | |
|---|---|
| ***H01R 13/64*** | (2006.01) |
| ***H01R 13/74*** | (2006.01) |
| ***H01R 25/00*** | (2006.01) |
| ***H01R 27/02*** | (2006.01) |
| *H01R 13/58* | (2006.01) |
| *H01R 13/655* | (2006.01) |

(52) U.S. Cl.

CPC ......... *H01R 13/748* (2013.01); *H01R 25/006* (2013.01); *H01R 27/02* (2013.01); *H01R 13/5804* (2013.01); *H01R 13/655* (2013.01); *H01R 2201/26* (2013.01)

(56) References Cited

U.S. PATENT DOCUMENTS

| | | | | |
|---|---|---|---|---|
| 5,783,774 | A | 7/1998 | Bowman et al. | |
| 6,004,162 | A | 12/1999 | Harting et al. | |
| 6,527,302 | B1 | 3/2003 | Gault et al. | |
| 6,733,345 | B2 | 5/2004 | Weise et al. | |
| 6,986,676 | B1 * | 1/2006 | Tronolone | H01R 13/514 439/247 |
| 7,160,147 | B1 * | 1/2007 | Stephan | H01R 29/00 439/535 |
| 7,439,442 | B2 | 10/2008 | Schutte | |
| 7,909,643 | B2 * | 3/2011 | Pepe | H01R 13/514 439/540.1 |
| 8,287,305 | B2 * | 10/2012 | Sil | H01R 13/443 439/535 |
| 8,642,885 | B2 | 2/2014 | Davila et al. | |
| 8,686,287 | B1 | 4/2014 | Gretz | |
| 8,701,911 | B2 | 4/2014 | Youssef et al. | |
| 8,901,417 | B2 | 12/2014 | Herring et al. | |
| 8,952,252 | B2 | 2/2015 | Bugaris et al. | |
| 9,035,175 | B2 | 5/2015 | Korcz et al. | |
| 9,705,225 | B1 | 7/2017 | Musick | |
| 10,129,443 | B2 * | 11/2018 | Shiraishi | H01R 13/64 |
| 2004/0198100 | A1 | 10/2004 | Fink et al. | |
| 2010/0221955 | A1 * | 9/2010 | Pepe | H01R 13/514 439/676 |
| 2013/0084050 | A1 | 4/2013 | Vastmans et al. | |
| 2013/0337680 | A1 | 12/2013 | Schlegel | |
| 2016/0241007 | A1 | 8/2016 | Tremaine et al. | |
| 2021/0325621 | A1 | 10/2021 | Vastmans et al. | |
| 2021/0408774 | A1 | 12/2021 | Hellige et al. | |

FOREIGN PATENT DOCUMENTS

| | | | |
|---|---|---|---|
| CN | 212392437 | U | 1/2021 |
| DE | 202010008934 | U1 | 2/2012 |
| DE | 102011001064 | | 4/2012 |
| EP | 0860906 | B1 | 5/2004 |
| EP | 2845277 | A2 | 3/2015 |
| GB | 2295502 | A | 5/1996 |
| JP | 2002095141 | A | 3/2002 |
| KR | 20080002503 | Y1 | 12/2008 |
| TW | M364914 | U | 9/2009 |

* cited by examiner

MULTIPLE-COMBINATION CONNECTOR

CROSS-REFERENCE TO RELATED APPLICATION

This application is a national stage application, filed under 35 U.S.C. § 371, of International Patent Application PCT/DE2022/100161, filed on Feb. 28, 2022, which claims the benefit of Chinese Patent Application CN 202110281317.7, filed on Mar. 16, 2021.

TECHNICAL FIELD

The present invention relates to the technical field of connectors, in particular multiple-combination connectors.

BACKGROUND

Connectors, which are widely used in the field of rail vehicles, in particular high-current connectors, are used in particular for electrical and signaling connection between two zones, in particular between two carriages. However, when used in practice, such connectors normally have a large weight and volume, which is disadvantageous for field installation by users. Moreover, in order to meet different application requirements, such as, for example, different current strength requirements and different cable quantity requirements, it is usually necessary to provide a plurality of connectors.

SUMMARY

The object of the present disclosure is to provide a multiple-combination connector which can bring about a flexible combination of different types and different numbers of plugs/sockets and can meet different application requirements; by designing an individual plug, it is possible to mount and dismount the cables one after the other, whereby assembly is facilitated; the connector can prevent incorrect insertion and is robust on dismounting and mounting; the problem of powder spraying can easily be overcome, and EMC, IP (water and dust tightness) and protective earthing functions are implemented; the accumulation of rain, snow, ice and dust is effectively prevented; it is compact and can easily be installed.

According to a first aspect there is provided a multiple-combination connector comprising: a housing which is formed by a lower housing and a matching upper housing, wherein the lower housing has at least one opening; at least one socket which is attached to the opening; and a plurality of individual plugs which can be inserted independently of one another into the socket. Compared to plug modules according to the prior art, in which a plurality of plugs are integrated, the weight of the individual plug is reduced considerably.

In an advantageous embodiment, the lower housing has two openings, wherein the planes of the two openings are oriented parallel to one another and are spaced apart from one another. That is to say, the two openings are stepped in order to facilitate installation of the plug.

In an advantageous embodiment, the socket is attached to one opening of the two openings, wherein the other opening is covered by a cover, and wherein the cover has a drilled hole; or wherein sockets are attached to both openings; wherein the sockets are of the same type or of different types and the plugs are of the same type or of different types.

When fewer cables are required, a cover can advantageously be fitted to one of the two openings, so that the cable can be inserted only through the socket at the one opening. When the cable of the connector does not have to be inserted into the compartment and is designed for 180°, namely when the cable to be guided out is at 180° relative to the cable to be inserted, holes can be drilled into the cover of the opening so that the cable to be guided out can be passed through.

When more cables are required, a socket is advantageously attached to both openings. The two sockets can be designed as sockets of the same type, such as high-current sockets of the same type; they can also be designed as sockets of different types, such as high-current sockets of different types.

By selecting the number of sockets and the type of sockets, a multiple-combination connector can be obtained.

In an advantageous embodiment, the socket comprises an insertion side for insertion of the plugs and an installation side for attachment to the opening; wherein the socket has on the insertion side a plurality of socket modules, and wherein each socket module has a bush and a flange surrounding the bush. Each socket module corresponds to a plug.

In an advantageous embodiment, the flange of the socket module is provided with a coding pin hole and a threaded hole, wherein a coding pin is inserted into the coding pin hole and a threaded insert is inserted into the threaded hole. Preferably, the threaded insert consists of steel, such as, for example, stainless steel. In a preferred embodiment, the flange of the socket module is provided with two diagonally arranged coding pin holes and two diagonally arranged threaded holes. Preferably, each coding pin hole is provided with four coding positions.

In an advantageous embodiment, a poka-yoke guide groove is provided on the inside wall of the bush.

In an advantageous embodiment, the plug comprises a plug portion, a flange and a grip, which are connected one after the other.

In an advantageous embodiment, the flange is square or rectangular; wherein the grip is a grip having four corners and is designed such that it rotates through 90 degrees and is combined with the flange in order to provide corners for the arrangement of coding pin holes and threaded holes.

Preferably, the flange is provided at the corners with two diagonally arranged coding pin holes and two diagonally arranged threaded holes for receiving the coding pins and the locking elements, respectively.

In an advantageous embodiment, a poka-yoke guide rib is arranged on the periphery of the plug portion.

When the plug is inserted into the socket, in particular into the socket module, the poka-yoke guide rib of the plug slides into the poka-yoke guide groove of the bush in order to facilitate insertion and to prevent incorrect insertion; the coding pin of the flange of the plug mates with the coding pin of the flange of the socket module in order to prevent incorrect insertion, and with the arrangement of the diagonal coding holes and the four coding positions of each coding hole, 16 coding combinations can be achieved; the locking element of the flange of the plug is inserted into the threaded hole, provided with the threaded insert, of the flange of the socket module, wherein, by using a threaded insert made of steel, seizing up caused by corrosion of thread of aluminum is avoided, whereby up to 500 locking/unlocking cycles can be performed, and wherein it is robust on dismounting and mounting.

In an advantageous embodiment, a locking ring is arranged in the plug portion in the interior, for locking a plug contact received in the plug. In particular, a locking groove is provided on the inside wall of the plug portion, when the locking ring rotates through a specific angle and is attached to the interior of the locking groove, the plug contact can be locked in the plug portion in order to prevent it from falling out.

In an advantageous embodiment there is arranged in the interior of the end piece of the grip a shielding clip which consists of two halves, wherein the half comprises a half-shell and two cable strain relief parts arranged on the inside of the half-shell and a shielding plate located between the two cable strain relief parts; and wherein the shielding plate comprises two scaled portions for contacting the inside wall of the plug and a contacting portion, located between the two scaled portions, for contacting the cable shielding layer of the cable, and wherein the contacting portion is formed by a plurality of contact pins. The contact pin is preferably resilient. Owing to the design of the cable strain relief part and of the resilient contact pin, the shielding clip can be adapted to cable shielding layers of different sizes.

In an advantageous embodiment, the opening of the lower housing is provided with a protruding interface which is used for attachment to the socket. The problem of powder spraying can easily be solved by the protruding design, so that the interface is not sprayed with anti-corrosion and anti-oxidation powder, whereby the functioning of the electrical connector is not impaired.

In an advantageous embodiment, the lower housing is further provided with a through-opening, wherein the plane of the through-opening and the plane of the opening are oriented perpendicular to one another; and wherein the lower housing can be installed on the installation plate, and wherein the through-opening is directed toward the installation plate; and wherein there is arranged on a side wall of the lower housing an installation flange which comprises an installation flange, installed on the installation plate, for the installation plate and an installation flange, installed on the upper housing, for the upper housing, and wherein the installation flange for the installation plate and the installation flange for the upper housing are oriented in an L-shape relative to one another, and wherein the side wall of the lower housing is formed in an L-shape with each of the installation flange for the installation plate and the installation flange for the upper housing. Owing to the L-shaped design, the space is used appropriately, in order to reduce the size of the lower housing.

In an advantageous embodiment, the upper housing as a whole is dome-shaped and streamlined; wherein the upper housing comprises a main body, a first flange in the form of an overhang protruding from one side of the main body, and a second flange protruding from the other side of the main body, and wherein the main body, the first flange and the second flange are each streamlined, and wherein the first flange covers the opening from above, and wherein the second flange comprises an installation flange for the lower housing. By means of the streamlined design, the accumulation of rain, snow, ice and dust can effectively be prevented.

In an advantageous embodiment, the installation flange for the upper housing and the installation flange of the lower housing each have a protective earthing screw hole, so that they are attached by means of a protective earthing screw to a protective earthing cable connection.

In an advantageous embodiment, the connector further comprises a contact module and an insulating cap, which are accommodated in the housing; an installation plate on which the lower housing is installed; an installation frame, which is installed on a side of the installation plate opposite the lower housing; and a cable strain relief frame, which is installed on the installation frame. Preferably, the installation plate and the installation frame each have a through-opening which corresponds to the through-opening of the lower housing.

BRIEF DESCRIPTION OF THE DRAWINGS

The exemplary embodiments of the present invention are shown in the figures and explained in greater detail hereinbelow.

DETAILED DESCRIPTION

The present invention will be explained in greater detail hereinbelow in connection with exemplary embodiments and figures. In the description, identical or similar reference signs denote the same or similar components. The following explanation of the embodiment in connection with figures is used to explain the overall concept of the present invention and is not to be understood as being limiting for the present invention.

Figure 1:
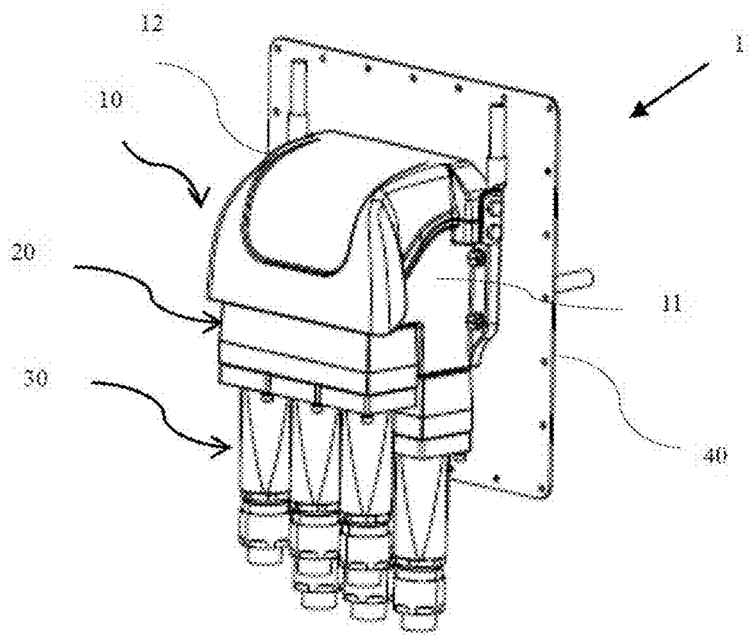
FIG. 1 shows a perspective view of a connector according to a first embodiment.

FIG. 1 shows a connector in a first embodiment. The connector 1 comprises a housing 10, a socket 20 attached to the housing 10, a plurality of individual plugs 30 which can be inserted independently of one another into the socket 20, and an installation plate 40, wherein the housing 10 is installed on the installation plate. The installation plate is also referred to as a compartment wall installation plate and is used for installation on a compartment wall, that is to say normally the carriage wall of a train. The housing 10 comprises a lower housing 11 installed on the installation plate 10, and an upper housing 12 which covers the lower housing. In the embodiment, the connector 1 comprises two sockets 20, wherein each socket receives three plugs, that is to say 6 plugs in total.

Figure 2:
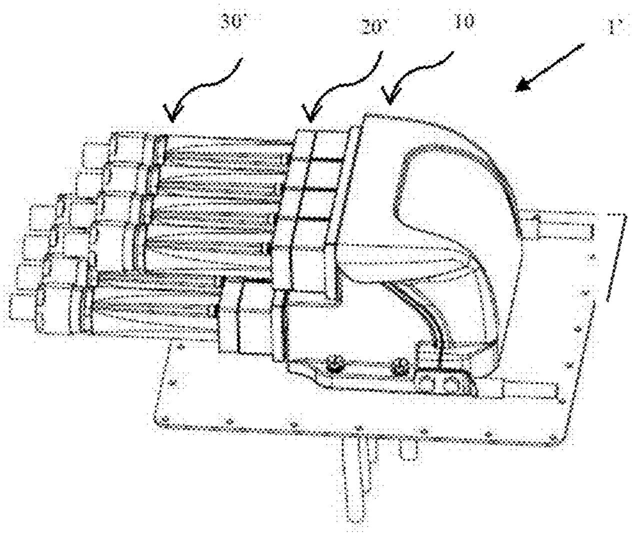
FIG. 2 shows a perspective view of a connector according to a second embodiment.

FIG. 2 shows a connector in a second embodiment. The difference between the connector 1' and the connector 1 of the first embodiment is that each socket 20' can receive four plugs 30', that is to say eight plugs in total. The plug 30 and the plug 30' are each a high-current (HC) plug, such as high-current plugs of 650 A, 350 A or 250 A.

Figure 3:
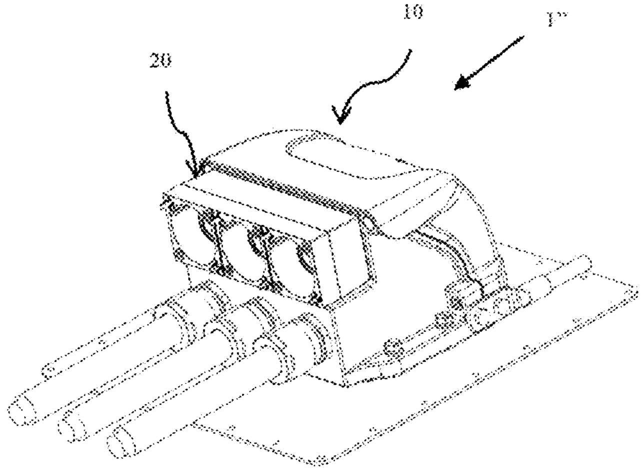
FIG. 3 shows a perspective view of a connector according to a third embodiment.

FIG. 3 shows a connector in a third embodiment, the difference between the connector 1" and the connector 1 of the first embodiment is that the connector 1" has only one socket 20 and receives three plugs in total. When the cables do not have to be inserted into the interior of the carriage, the three cables can be guided out of the other opening 111 of the housing (which will be explained hereinbelow in connection with FIG. 5) and secured by means of cable guides.

Figure 4:
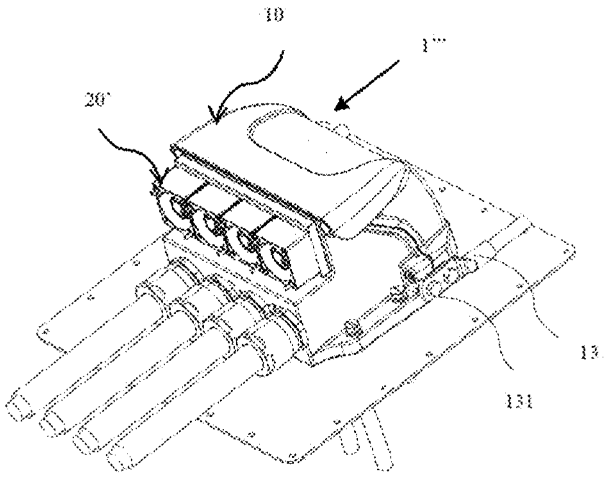
FIG. 4 shows a perspective view of a connector according to a fourth embodiment.

FIG. 4 shows a connector in a fourth embodiment, wherein the difference between the connector 1'" and the connector 1' of the second embodiment is that the connector 1" has only one socket 20' and receives four plugs in total. Four cables can be guided from the other opening 111 of the housing (which will be explained hereinbelow in connection with FIG. 5) and secured by means of cable guides.

It should be obvious to a person skilled in the art in this field that there are embodiments such that the connector comprises two sockets 20 and 20' of different types, wherein the two sockets can be used to receive different types of plugs 30 and 30'. In this way, many different combinations of connectors can be obtained.

Figure 5:
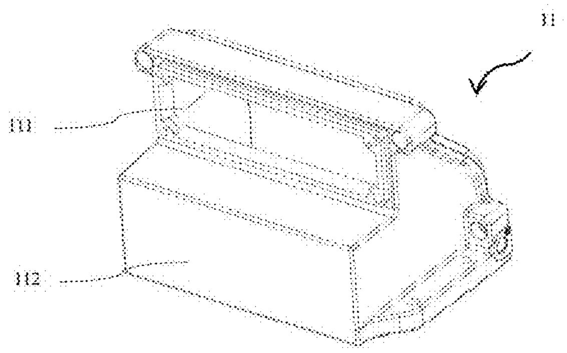
FIG. 5 shows a perspective view of a lower housing according to an embodiment.
Figure 6:
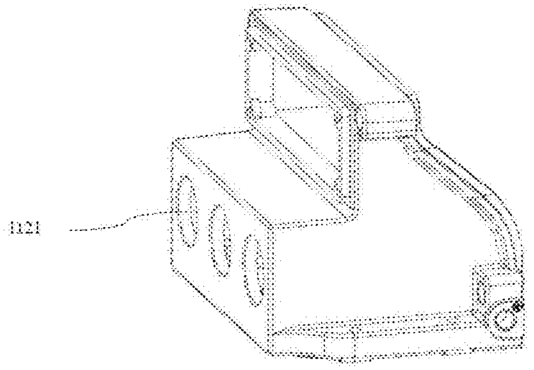
FIG. 6 shows a perspective view of a use state of the lower housing according to FIG. 5.
Figure 7:
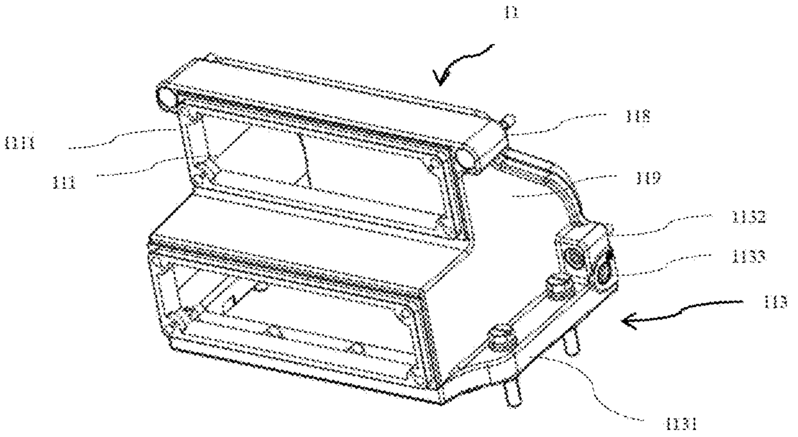
FIG. 7 shows a perspective view of a lower housing according to another embodiment.
Figure 8:
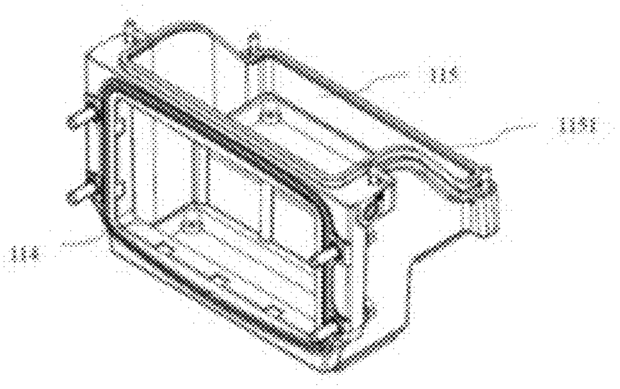
FIG. 8 shows a perspective view of the lower housing according to FIG. 7 from a different perspective.
Figure 9:
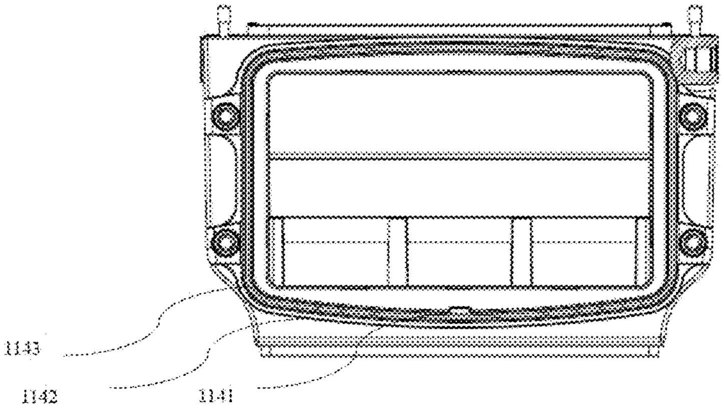
FIG. 9 shows a bottom view of the lower housing according to FIG. 7.
Figure 10:
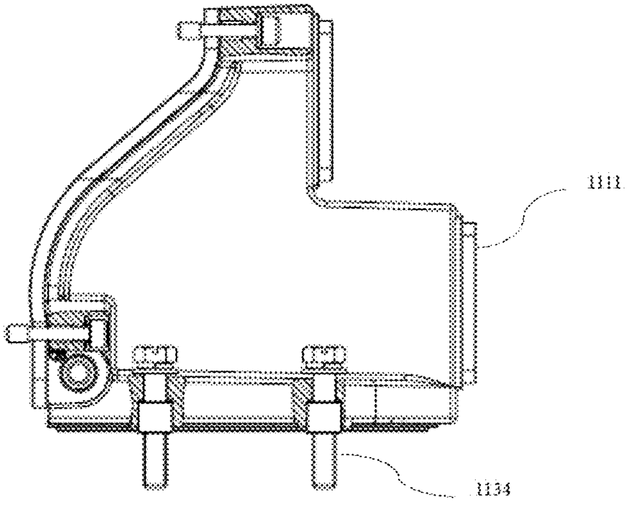
FIG. 10 shows a side view of the lower housing according to FIG. 7.

FIG. 5 shows a perspective view of a lower housing 11 in an embodiment, wherein the lower housing has two openings 111, wherein one opening 111 is closed by the cover 112. When the cables have to be inserted into the carriage, the cover can be kept closed. When the cables do not have to be inserted into the carriage, as is shown in FIG. 6, the cover 112 is provided with drilled holes 1121 in order to guide the cables out of the lower housing. The lower housing is suitable for the connectors according to FIGS. 3 and 4.

FIGS. 7 to 10 show a perspective view of a lower housing 11 in another embodiment, wherein the lower housing likewise has two openings 111, wherein a socket is to be connected to both openings. The lower housing is suitable for the connectors according to FIGS. 1 and 2. The opening 111 is provided with a protruding interface 1111, which is used for attachment to the socket. Problems on powder spraying can be solved with the protruding interface. In particular, the housing 10 consists of metal, whereby the shielding properties of the housing, in particular the shielding properties with respect to electromagnetic fields, are improved. However, the housing must undergo powder spraying treatment in order to prevent corrosion and oxidation. However, the interface 1111 cannot be sprayed with powder because it has a function for electrical connection to the socket, and otherwise an infinitely large resistance value would be caused. Therefore, with the protruding design, it is possible that the powder is not sprayed onto the interface during powder spraying. The four corners of the interface 1111 are provided with a screw hole, and the inner peripheral surface of the interface is polygonal. On the side wall 119 of the lower housing 11 there is formed an installation flange 113, wherein the installation flange comprises: an installation flange 1131 for the installation plate, which installs the lower housing on the installation plate 40 by means of a locking element 1134, wherein the locking element 1134 (FIG. 10) comprises a screw, a sealing element and a washer in order to implement the EMC function and the water- and dust-tight IP function; an installation flange 1132 for the upper housing, which is used for installing the lower housing on the upper housing 12. The installation flange for the upper housing has both a screw hole, which is used for installing the lower housing on the upper housing, and a protective earthing screw hole for installing a protective earthing (PE) screw.

Preferably, the side wall 119 is formed in an L-shape both with the installation flange 1131 for the installation plate and with the installation flange 1132 for the upper housing; wherein the installation flange 1131 for the installation plate and the installation flange 1132 for the upper housing are likewise oriented in an L-shape relative to one another. With this design, the space is expediently used and the size of the lower housing is reduced. so that the locking screw and the protective earthing screw can be arranged appropriately in order to implement the locking function and the protective earthing function.

The lower housing 11 comprises a substantially rectangular through-opening 114, wherein the plane of the through-opening 114 and the plane of the opening 111 are oriented perpendicular to one another, and wherein the through-opening 114 faces the installation plate 40. A streamlined contour 1142 is arranged around the through-opening 114 at the base of the lower housing 11 in order to prevent the ingress of rain, snow, ice and dust from the external environment into the through-opening. In addition, the lower housing 11 is further provided with a recess which surrounds the through-opening 114, wherein the sealing element 1143 is placed in the recess in order to seal the installation plate 40 and the corresponding through-opening 114 of the lower housing and thus prevent the ingress of media. On the inside of the sealing element 1143 there is further provided a gap 1141 through which the sealing element can easily be removed during maintenance without causing any damage. The lower housing 11 further comprises an entry 115 through which the opening 111 and the through-opening 114 can be reached from the rear in order to facilitate installation of the connecting element. On assembly of the upper housing 12, the entry 115 is covered. On the peripheral wall of the entry 115 there is formed a streamlined rib 1151 which can reduce the size of the lower housing and can provide guiding on assembly of the upper housing, and the EMC function and the water- and dust-tight IP function are additionally implemented.

Figure 11:
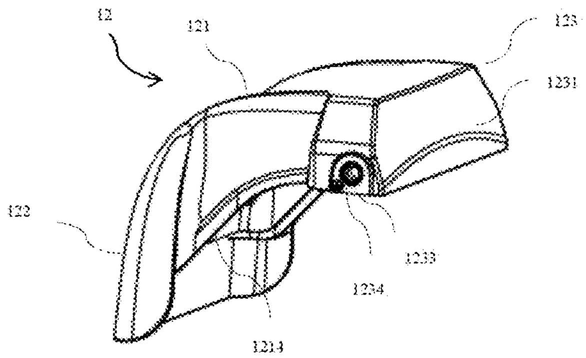
FIG. 11 shows a perspective view of an upper housing according to an embodiment.
Figure 12:
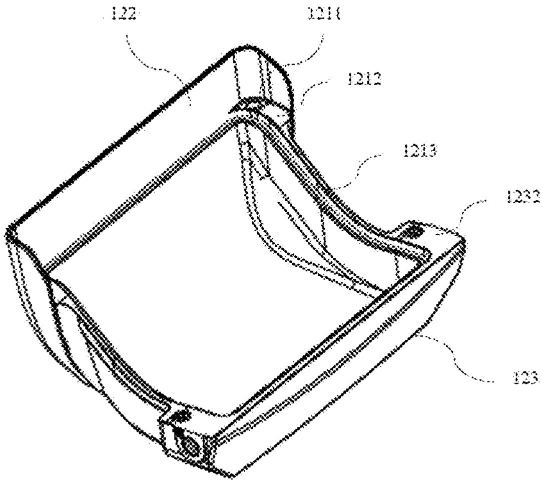
FIG. 12 shows a bottom view of the upper housing according to FIG. 11.

FIGS. 11 and 12 show an upper housing 12. The upper housing 12 as a whole is dome-shaped and streamlined. By means of the dome-shaped and streamlined design, the ingress of rain, snow, ice and dust into the housing can effectively be prevented. The upper housing 12 comprises a streamlined main body 121, a streamlined first flange 122 in the form of an overhang protruding from one side of the main body, and a streamlined second flange 123 protruding from the other side of the main body. The first flange 122 is a long flange, as shown in FIG. 1, wherein it covers the opening 111 of the lower housing 11 from above in order to prevent the ingress of rain, snow, ice and dust into the opening, and it is additionally required for the EMC function. As is shown in FIG. 1, the second flange 123 is located close to the installation plate 40, wherein the base 1231 faces the installation plate, wherein the base is streamlined and the middle protrudes so that water and dust are able to flow away from the two sides of the protruding middle without water and dust accumulating. The second flange 123 comprises an installation flange 1232 for the lower housing on both sides, in addition to the screw hole for locking the screw, the installation flange for the lower housing further has a protective earthing screw hole 1233 for the protective earthing screw, and a protective earthing plate 1234 surrounding the screw hole. On assembly of the upper housing and the lower housing, the installation flange 1132 for the upper housing and the installation flange 1232 for the lower housing fit together, they are both locked together by the locking screw and screwed by the protective earthing screw 131 into the protective earthing screw holes 1133, 1233 in order to connect the protective earthing cable connection 13 (FIG. 4), whereby the protective earthing of the housing 10 is implemented. The upper side of the two side walls of the main body 121 has an L-shaped or U-shaped flange 1213 for receiving the sealing element, whereby the EMC function and the water- and dust-tight IP function are implemented, wherein the outer side of the upper side of the side wall further has a rib 1214, wherein the upper housing can be reinforced by the rib, and in addition it is required to form the L-shaped or U-shaped flange 1213. At a corner of the main body 121 facing the first flange 122 there is formed a screw hole 1211 in order to install the upper housing on the installation part 118 (FIG. 7) of the lower housing by means of the locking screw, wherein an I-shaped part 1212 is arranged at the periphery of the screw hole, wherein by means of the I-shaped part more space is obtained and the size of the upper housing can be reduced. Because the screw hole 1211 is arranged in the I-shaped part 1212, it is outside the sealing element of the flange 1213 and increases the IP class.

Figure 13:
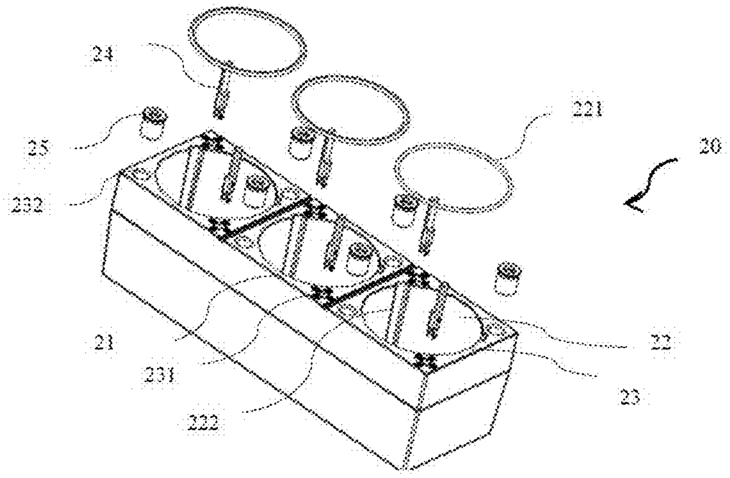
FIG. 13 shows an exploded view of a socket.
Figure 14:
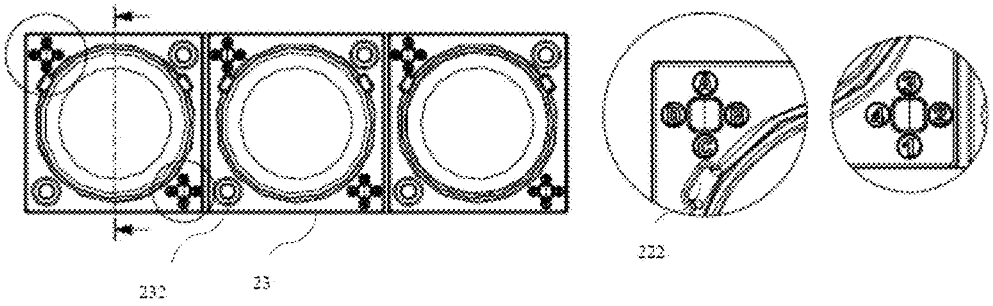
FIG. 14 shows a top view of the socket according to FIG. 13.
Figure 15:
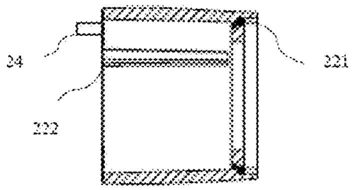
FIG. 15 shows a sectional view of an individual socket module.
Figure 16:
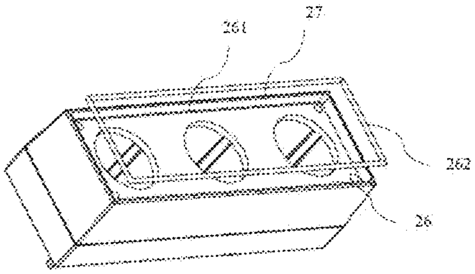
FIG. 16 shows a bottom view of the socket according to FIG. 13.

FIGS. 13 to 15 show a plug 20; the plug 20 comprises an insertion side for insertion of the plug and an installation side for attachment to the opening 111 of the lower housing. The socket has on the insertion side a plurality of socket modules 21, wherein each socket module has a bush 22 and a flange 23 surrounding the bush. The cross section of the bush 22 is substantially circular and passes through the entire socket, wherein a sealing element 221 is arranged in the bush, and wherein there is provided on the inside wall of the bush a poka-yoke guide groove 222 which is used to coordinate with the poka-yoke guide rib (explained in greater detail hereinbelow) of the plug in order to guide the plug correctly and avoid incorrect insertion. The flange 23 is square or rectangular, wherein there are provided at its corners coding pin holes 231 and threaded holes 232 for receiving coding pins 24 and threaded inserts 25, respectively. Preferably, the four corners are provided diagonally with two coding pin holes 231 and two threaded holes 232. The threaded hole usually consists of aluminum or an aluminum alloy, wherein the aluminum thread would corrode after long-term use. Because of this, a threaded insert of steel, such as stainless steel, is arranged in the threaded hole in order to prevent corrosion of the aluminum thread leading to seizing of the locking screw in the threaded hole. Because of this, the diagonally arranged threaded holes and the threaded inserts inserted into the holes can perform about 500 locking/unlocking cycles. As is shown in FIG. 14, the coding pin holes 231 are in fact multiple coding pin holes, namely coding positions which are each numbered "A, B, C, D" and "1, 2, 3, 4". Because the coding pin is inserted in different coding positions, 16 combinations can be achieved. The coding pin 24 mates with the corresponding coding pin on the plug in order to prevent incorrect insertion. According to FIG. 16, the installation side of the socket 20 has a substantially rectangular base 26 comprising an interface projection 27 of the base 26 for connection to the interface 1111 of the opening 111, a sealing groove 261 surrounding the base 26, and a rectangular sealing element 262 accommodated in the sealing groove 261.

Figure 17:
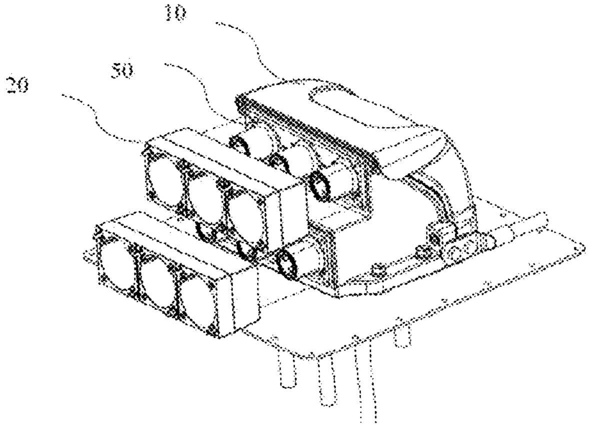
FIG. 17 shows an exploded view of a connector according to the first embodiment, wherein the plug is not shown.
Figure 18:
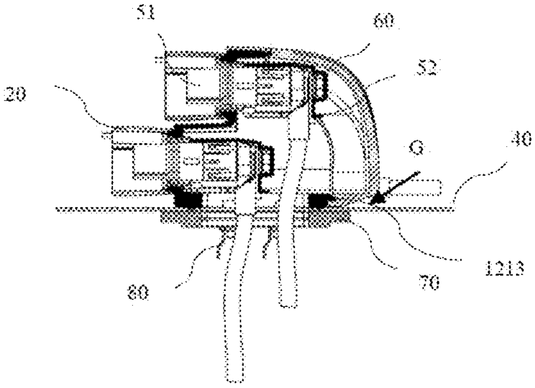
FIG. 18 shows a sectional view according to FIG. 17.
Figure 19:
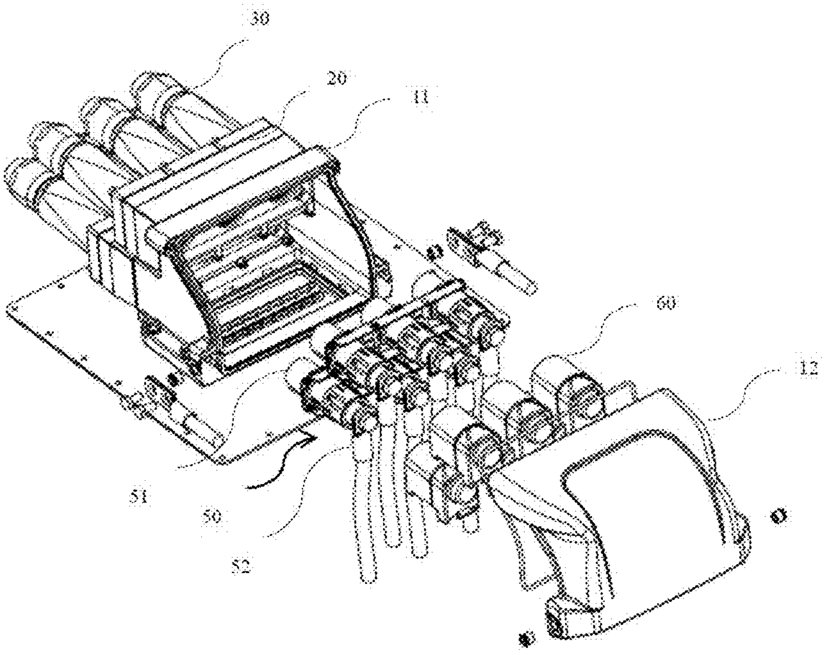
FIG. 19 shows an exploded view of a connector according to the first embodiment, wherein the connector has a plug.
Figure 20:
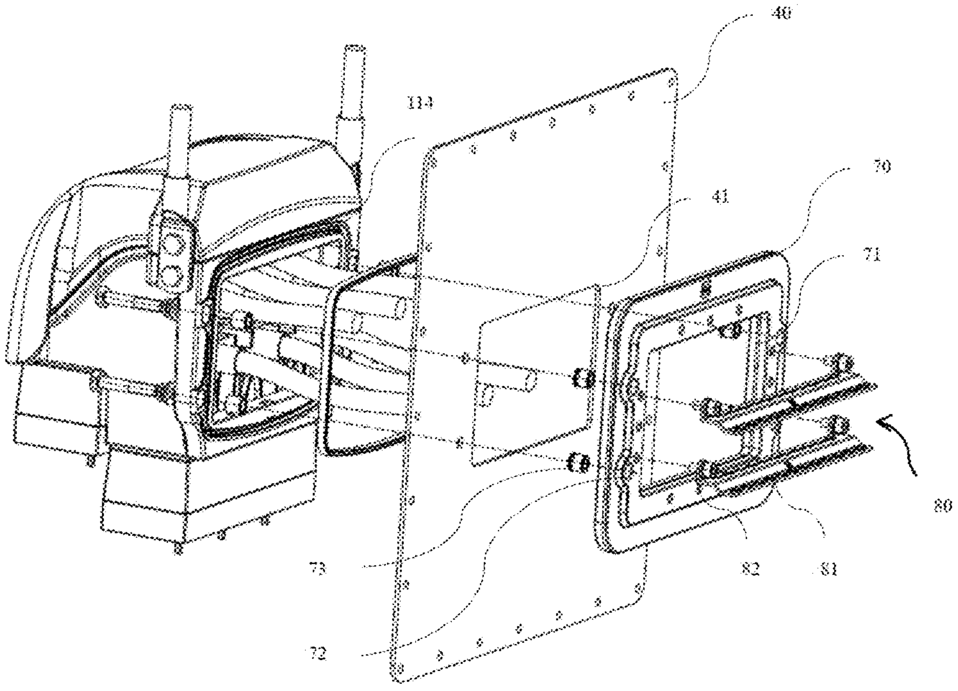
FIG. 20 shows an exploded view of the construction of a connector according to the first embodiment, wherein the plug is not shown.

FIGS. 17 to 19 show the components in the housing of a connector in a first embodiment. A contact module 50, namely a high-current contact module, is accommodated in the housing 10 of the connector 1. A plurality of contacts 51, namely bush contacts, are integrated in the contact module; the number of contacts corresponds to the number of bushes of the socket, and the contacts 51 project through the opening 111 into the bush 22 of the socket 20. The end piece of the module is connected to the cable by way of a cable connection 52, so that the cable protrudes from the through-opening 114 of the lower housing 11. The plurality of insulating caps 60 cover the end piece of the contact. FIG. 20 shows other components of the connector, and the cable protruding from the through-opening 114 passes in succession through the installation plate 40, the installation frame 70 and the cable strain relief frame 80. The installation frame 70 is used to reinforce the installation plate 40 in order to prevent deformation of the installation plate 40. The cable strain relief frame 80 is a metal frame and prevents the cable that is guided out from being damaged as a result of strain. The installation plate 40 and the installation frame 70 each have a through-opening 41 and 71, which corresponds to the through-opening 114 of the lower housing. Threaded inserts 73 are inserted into the screw holes 72 at the periphery of the through-opening 71 of the installation frame 70. The threaded insert consists of steel, such as stainless steel, and can therefore provide protection against fire, so that, even in the event of fire, the installation frame does not fall away from the compartment wall (e.g. of a carriage) to which it is attached. The cable strain relief frame 80 is formed by two separate metal frames 81 which are fastened to the installation frame 70 by a screw in order to provide strain relief for the cable that is guided out. Again with reference to FIG. 18, there is a relatively large gap G between the base of the second flange 122 of the upper housing 12 and the installation plate 40, in order to prevent the accumulation of rain, snow, ice and dust. The EMC and IP functions are better achieved with the L-shaped flange 1213 of the upper housing 12.

Figure 21:
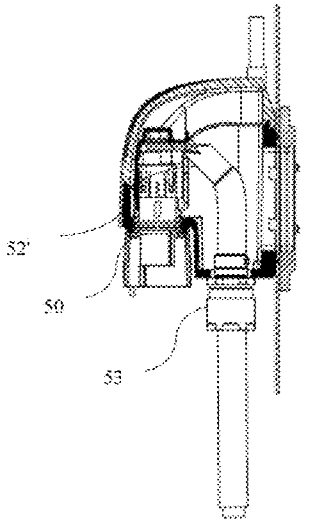
FIG. 21 shows a sectional view of a connector according to the third embodiment.
Figure 23:
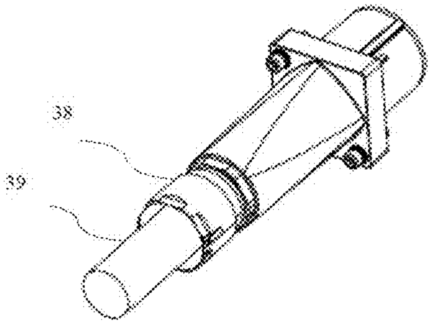
FIG. 23 shows a perspective view of the plug according to FIG. 22 from a different perspective.
Figure 22:
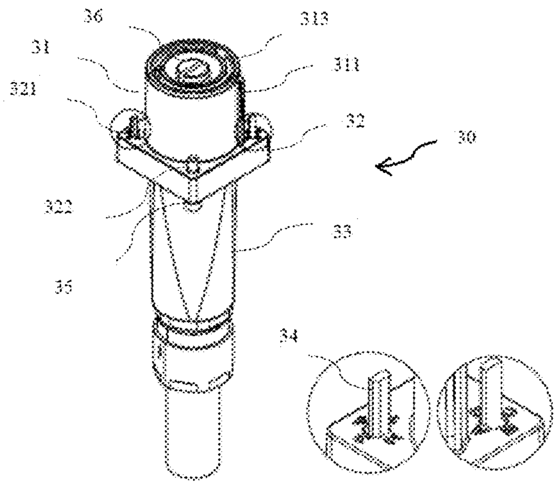
FIG. 22 shows a perspective view of a plug.
Figure 24:
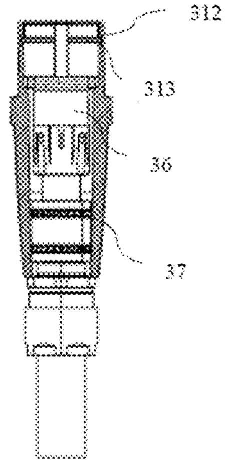
FIG. 24 shows a sectional view according to FIG. 22.
Figure 25:
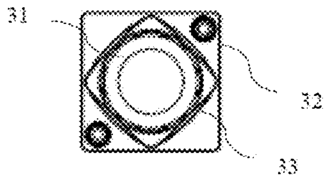
FIG. 25 shows a top view according to FIG. 22.

FIG. 21 shows a sectional view of a connector 1" in a third embodiment. A contact module 50 is accommodated in the housing 10 of the connector 1", wherein the end piece of the contact 51 is connected to the cable by an angled cable connection 52', while the cable is guided out of the housing through the other opening 111 of the lower housing and is secured by means of cable guides 53.

FIGS. 22 to 28 show a plug 30. The plug 30 comprises a plug portion 31, a flange 32 and a grip 33, which are connected one behind the other. The plug portion 31 is cylindrical, wherein a poka-yoke guide rib 311 is arranged on its periphery; when the plug is inserted into the socket, the poka-yoke guide rib 311 mates with the poka-yoke guide groove 222 in the bush 22 of the socket, in order to guide the plug for insertion into the socket and prevent incorrect insertion. In the plug portion 31 there is a contact 36, namely a plug contact, wherein the contact is a high-current contact. On the inside wall of the plug portion there is a locking groove 312. A rib is arranged on the outside wall of the locking ring 313 in the plug portion 31. When the rib of the outside wall of the locking ring is connected to the interior of the locking groove 312, the contact 36 can easily be locked in order to prevent it from falling out of the plug portion. The flange 32 is square or rectangular, wherein there are provided at its corners coding pin holes 321 and threaded holes 322 which are used for receiving coding pins 34 and locking elements 35, respectively. Preferably, the four corners are provided diagonally with two coding pin holes 321 and two threaded holes 322. The coding pin holes 321 are in fact multiple coding pin holes, namely multiple coding positions which are each numbered "A, B, C, D" and "1, 2, 3, 4". Because the coding pins 34 are inserted in different coding positions, 16 combinations can be achieved. The coding pin 34 mates with the corresponding coding pin 24 on the plug in order to prevent incorrect insertion. The grip 33 is a quadrangular grip, wherein its head portion has a square cross section, which is clearly shown in FIG. 25, wherein the grip 33 is so constructed that it rotates through 90 degrees and mates with the flange 32, in order to provide corners for the arrangement of coding pins 34 and locking elements 35; otherwise, the corner of the flange does not provide sufficient space for the arrangement of the coding pins and the locking elements. The rear end of the grip 33 is circular, wherein the grip is connected at the rear end to the cable 39 by the cable guide 38.

Figure 26:
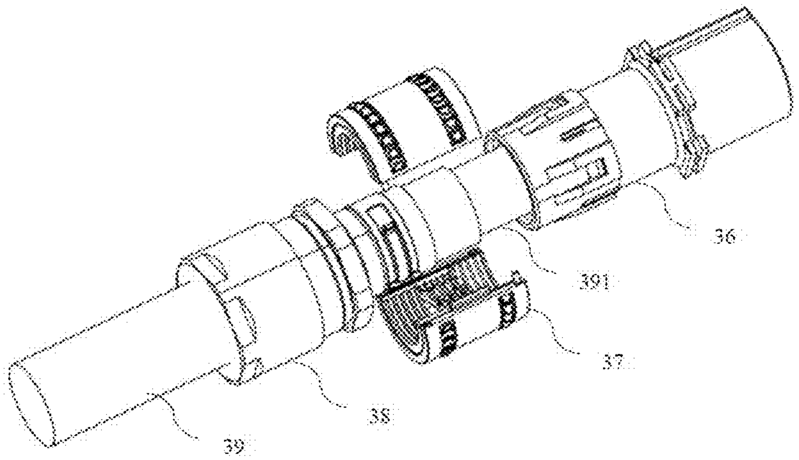
FIG. 26 shows a diagram of the internal structure of the plug according to FIG. 22 after the grip has been removed.

FIG. 26 shows the inner structure of the plug after removal of the grip. A contact 36 and a cable 39 connected to the contact are accommodated in the grip, wherein the outer insulating sheathing of the cable has been removed in order to expose the cable shielding layer 391. The outside of the cable shielding layer 391 is enclosed by a shielding clip, which is formed by two identical halves 37.

Figure 27:
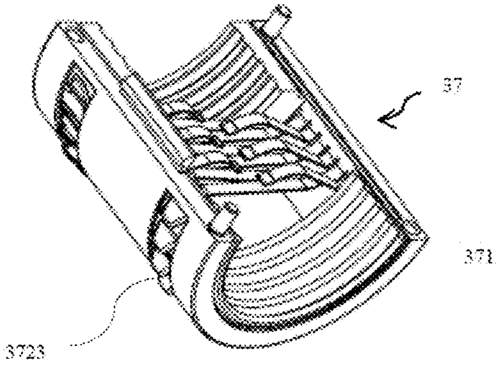
FIG. 27 shows a perspective view of a half of the shielding clip.
Figure 28:
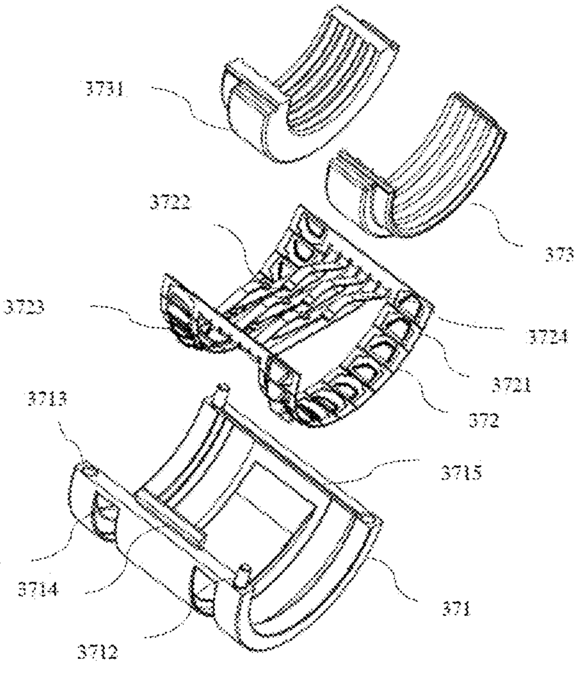
FIG. 28 shows an exploded view of a half of the shielding clip.

In connection with FIGS. 27 and 28, the structure of the half 37 of the shielding clip will be explained in greater detail hereinbelow. The half 37 is half-cylindrical and formed by a half-shell 371, two cable strain relief parts 373 arranged on the inside of the half-shell, and a shielding plate 372 located between the two cable strain relief parts. The axial section of the half-shell 371 is provided diagonally with two pins 3712 and two pin holes 3713; when two half-shells are fitted together, a complete shielding clip is obtained by joining the pins and the pin holes. A locking hook 3714 and a corresponding locking groove 3715 are further provided centrally on the axial section, when the two half-shells are fitted together, additional locking is provided. The middle region on the inside of the half-shell 371 protrudes, wherein the two sides of the protruding middle region have two strip-shaped openings 3711. The shielding plate 372 is implemented as a shielding plate metal tongue and comprises scaled portions 3721 located on both sides and a contact portion 3722 located between the two scaled portions 3721; wherein the scaled portion 3721 is formed by a plurality of scaled contact points 3723, and wherein the contact portion 3722 is formed by a plurality of contact pins 3724. When the shielding plate 372 is mounted in the half-shell 371, the contact portion 3722 is positioned on the protruding middle region of the half-shell, and the scaled portion 3721 is exposed by the opening 3711 on both sides of the middle region. The scaled contact point 3723 on the scaled portion 3721 can touch the inside wall of the plug in order to provide a protective earthing (PE) function and an EMC function. The contact pin 3724 of the contact portion 3722 is resilient and can thus cover the cable shielding layer of different sizes. On assembly, the outside wall of the cable strain relief part 373 has a protruding portion 3731 on both sides of the half-shell 371, which protruding portion is matched to the shape of the inside wall of the half-shell in order to permit adaptation for cable shielding layers of different sizes.

It is obvious to a person skilled in the art in this field that the present invention is not limited to the details of the exemplary embodiments. Moreover, the present invention can be implemented by different embodiments, provided that they do not depart from the ideas or essential features of the present invention.

The invention claimed is:

1. A multiple-combination connector (1, 1', 1", 1"), comprising:

a housing (10) which is formed by
- a lower housing (11) and
- a matching upper housing (12),
- the lower housing (11) comprising two openings (111) arranged in two planes that are oriented parallel to one another and are spaced apart from one another;

a socket (20) attached to a first of the two openings; and a plurality of individual plugs (30, 30') which can be inserted independently of one another into the socket, wherein a further socket (20') is attached to a second of the two openings, or the second of the two openings is covered by a cover (112), the cover (112) including a drilled hole (1121).

2. The multiple-combination connector (1, 1', 1", 1'") as claimed in claim 1, wherein the connector further comprises: a contact module (50) and an insulating cap (60), which are accommodated in the housing (10); an installation plate (40) on which the lower housing (11) is installed; an installation frame (70), which is installed on a side of the installation plate (40) opposite the lower housing (11); and a cable strain relief frame (80), which is installed on the installation frame (70).

3. The multiple-combination connector (1, 1', 1", 1'") as claimed in claim 1, wherein the opening (111) of the lower housing (11) is provided with a protruding interface (1111) which is used for attachment to the socket.

4. The multiple-combination connector (1, 1', 1", 1'") as claimed in claim 3, wherein the lower housing (11) is further provided with a through-opening (114), and wherein a plane of the through-opening (114) and the plane of the opening (111) are oriented perpendicular to one another; and wherein the lower housing (11) can be installed on an installation plate (40), and wherein the through-opening (114) is directed toward the installation plate (40); and wherein there is arranged on a side wall (119) of the lower housing (11) an installation flange (113) which comprises an installation flange, installed on the installation plate (40), for the installation plate (1131) and an installation flange, installed on the upper housing (12), for the upper housing (1132), and wherein the installation flange for the installation plate (1131) and the installation flange for the upper housing (1132) are oriented in an L-shape relative to one another, and wherein the side wall (119) of the lower housing is formed in an L-shape with each of the installation flange for the installation plate (1131) and the installation flange for the upper housing (1132).

5. The multiple-combination connector (1, 1', 1", 1''') as claimed in claim 4, wherein the upper housing (12) as a whole is dome-shaped and streamlined; and wherein the upper housing (12) comprises a main body (121), a first flange (122) in the form of an overhang protruding from one side of the main body, and a second flange (123) protruding from the other side of the main body, and wherein the main body, the first flange and the second flange are each streamlined, and wherein the first flange (122) covers the opening (111) from above, and wherein the second flange (123) comprises an installation flange for the lower housing (1232).

6. The multiple-combination connector (1, 1', 1", 1''') as claimed in claim 5, wherein the installation flange for the upper housing (1132) and the installation flange of the lower housing (1232) each have a protective earthing screw hole (1133, 1233) so that they are attached by means of a protective earthing screw (131) to a protective earthing cable connection (13).

7. A multiple-combination connector (1, 1', 1", 1'''), comprising:

a housing (10) which is formed by a lower housing (11) and a matching upper housing (12), wherein the lower housing (11) has at least one opening (111);

a socket (20, 20') which is attached to the opening; and a plurality of individual plugs (30, 30') which can be inserted independently of one another into the socket, wherein the socket (20) comprises an insertion side for insertion of the plug and an installation side for attachment to the opening (111); and wherein the socket has on the insertion side a plurality of socket modules (21), and wherein each socket module has a bush (22) and a flange (23) surrounding the bush.

8. The multiple-combination connector (1, 1', 1", 1''') as claimed in claim 7, wherein a poka-yoke guide groove (222) is provided on an inside wall of the bush (22).

9. The multiple-combination connector (1, 1', 1", 1''') as claimed in claim 7, wherein the lower housing (11) has two openings (111) arranged in two planes; and wherein the planes of the two openings are oriented parallel to one another and are spaced apart from one another.

10. The multiple-combination connector (1, 1', 1", 1''') as claimed in claim 9, wherein the socket (20) is attached to one opening of the two openings (11), and wherein the other opening is covered by a cover (112), and wherein the cover has a drilled hole (1121); or a further socket (20') is attached to the other opening.

11. The multiple-combination connector (1, 1', 1", 1''') as claimed in claim 7, wherein the flange (23) of the socket module (21) is provided with a coding pin hole (231) and a threaded hole (232), and wherein a coding pin (24) is inserted into the coding pin hole and a threaded insert (25) is inserted into the threaded hole.

12. The multiple-combination connector (1, 1', 1", 1''') as claimed in claim 11, wherein the flange (23) of the socket module (21) is provided with two diagonally arranged coding pin holes (231) and two diagonally arranged threaded holes (232).

13. A multiple-combination connector (1, 1', 1", 1'''), comprising:

a housing (10) which is formed by a lower housing (11) and a matching upper housing (12), wherein the lower housing (11) has at least one opening (111);

at least one socket (20, 20') which is attached to the opening; and a plurality of individual plugs (30, 30') which can be inserted independently of one another into the socket wherein each of the individual plugs (30) comprises a plug portion (31), a flange (32) and a grip (33), which are connected one after the other.

14. The multiple-combination connector (1, 1', 1", 1''') as claimed in claim 13, wherein there is arranged in an interior of an end piece of the grip (33) a shielding clip which consists of two halves (37), wherein at least one of the two halves (37) comprises a half-shell (371) and two cable strain relief parts (373) arranged on an inside of the half-shell and a shielding plate (372) located between the two cable strain relief parts; and wherein the shielding plate (372) comprises two scaled portions (3721) for contacting an inside wall of the plug and a contacting portion (3722), located between the two scaled portions, for contacting a cable shielding layer (391) of a cable (39), and wherein the contacting portion is formed by a plurality of contact pins (3724).

15. The multiple-combination connector (1, 1', 1", 1''') as claimed in claim 13, wherein the flange (32) is square or rectangular; wherein the grip (33) is a grip having four corners and is designed such that it rotates through 90 degrees and is combined with the flange (32) in order to provide corners for an arrangement of coding pin holes (321) and threaded holes (322).

16. The multiple-combination connector (1, 1', 1", 1''') as claimed in claim 15, wherein the flange (32) is provided at the corners with two diagonally arranged coding pin holes (321) and two diagonally arranged threaded holes (322) for receiving coding pins (34) and locking elements (35), respectively.

17. The multiple-combination connector (1, 1', 1", 1''') as claimed in claim 13, wherein a poka-yoke guide rib (311) is arranged on a periphery of the plug portion (31).

18. The multiple-combination connector (1, 1', 1", 1''') as claimed in claim 17, wherein a locking ring (31) is arranged in the plug portion (31) for locking a plug contact (36) received in the plug.

* * * * *